United States Patent
Kamiya et al.

(10) Patent No.: US 6,292,240 B1
(45) Date of Patent: Sep. 18, 2001

(54) TRANSPARENT TYPE LIQUID CRYSTAL DISPLAY WITH PLURALITY OF LIGHT TRANSMISSIVE PORTIONS ON REFLECTIVE PORTIONS FORMED ON BOTH SUBSTRATES

(75) Inventors: Hiroyuki Kamiya, Yamato; Yukito Saitoh, Sagamihara, both of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/520,452

(22) Filed: Mar. 8, 2000

(30) Foreign Application Priority Data

Mar. 8, 1999 (JP) .................................................. 11-060012

(51) Int. Cl.[7] ....................... G02F 1/1333; G02F 1/1335; G02F 1/1343
(52) U.S. Cl. ............................ 349/84; 349/113; 349/143; 349/110
(58) Field of Search ............................ 349/84, 113, 143, 349/144, 147, 165, 110

(56) References Cited

U.S. PATENT DOCUMENTS

| | | | | |
|---|---|---|---|---|
| 3,924,932 | * | 12/1975 | Yamamoto | 350/160 LC |
| 4,040,727 | * | 8/1977 | Ketchpel | 350/288 |
| 4,043,636 | * | 8/1977 | Eberhardt et al. | 350/160 LC |
| 4,508,428 | * | 4/1985 | Harada | 350/337 |
| 5,434,688 | * | 7/1995 | Saitoh et al. | 359/67 |
| 6,031,592 | * | 2/2000 | Shibahara | 349/113 |
| 6,144,429 | * | 11/2000 | Nakai et al. | 349/113 |
| 6,144,430 | * | 11/2000 | Kuo | 349/113 |
| 6,211,992 | * | 4/2001 | Van Aerle et al. | 359/254 |

* cited by examiner

Primary Examiner—William L. Sikes
Assistant Examiner—Tarifur R. Chowdhury
(74) Attorney, Agent, or Firm—Scully, Scott, Murphy & Presser; Casey August

(57) ABSTRACT

The present invention is to provide a novel transparent type liquid crystal display having a high contrast and transmittance that does not depend on an open area ratio without reducing a response speed. More specifically, the transparent type liquid crystal display of the present invention comprises at least a pair of first and second substrates 1 and 2 and a liquid crystal layer 3 interposed between the first and second substrates 1 and 2. A plurality of first light transmission portions 4 are formed on the first substrate 1, and a plurality of second light transmission portions 5 are formed on the second substrate 2. First reflective components 6 and second reflective components 7 are disposed on the respective main surfaces 1A and 2A of the first and second substrates 1 and 2 so that an external light entering into a transparent type liquid crystal display 20 through a plurality of first light transmission portions 4 is reflected by the first and second reflective components 6 and 7 and thereby passes through the liquid crystal layer 3 a plurality of times and then the external light exits through the second light transmission portions 5.

29 Claims, 2 Drawing Sheets

TRANSPARENT TYPE LIQUID CRYSTAL DISPLAY WITH PLURALITY OF LIGHT TRANSMISSIVE PORTIONS ON REFLECTIVE PORTIONS FORMED ON BOTH SUBSTRATES

BACKGROUND OF THE INVENTION

1. Technical Field

The present invention relates to a transparent type liquid crystal display and more particularly to a transparent type liquid crystal display which can be suitably used as the display for information processing terminal equipment such as a word processor and a personal computer or the display for a color television.

2. Prior Art

Demands for a laptop computer, a notebook type computer or a small-sized color television have been rapidly increasing because of the recent space saving and increase in personal use. A display for use in these requires characteristics such as thinness, light weight and low-voltage driving. Therefore, a liquid crystal display (sometimes referred to as LCD for short, hereinafter) is most widely used at present.

Although a driving system using a super twisted nematic (hereinafter referred to as a STN) liquid crystal has been heretofore employed for LCD, an active matrix system using a thin film transistor (hereinafter referred to as a TFT) device or the like is now employed because LCD having a high image quality, a high density and a large capacity is obtained. A mode of display using a sheet polarizer such as a Twisted Nematic (hereinafter referred to as a TN) and an In Plane Switching (hereinafeter referred to as an IPS) is the mainstream of LCD using the TFT device. However, the mode using the sheet polarizer can easily achieve a high contrast in general, while this mode has a problem that transmittance is reduced because the sheet polarizer is used.

Means for solving such a problem may be that the sheet polarizer is replaced by an absorption mode such as a Guest-Host (hereinafter referred to as a GH) and a Polymer Dispersed Liquid Crystal (hereinafter referred to as a PDLC) in which liquid crystal is doped with dyes so that the transmittance is improved. Conversely, LCD with the high contrast cannot be, however, obtained because a dichromatic ratio or the like of the dyes for use in the absorption mode is low.

Moreover, the transmittance is limited by an area of a pixel which a light from a back light passes through, i.e., a so-called open area ratio, and the transmittance is determined in rough proportion to this open area ratio. Hence, another problem exists. That is, when the TFT device is increased in size or when a gate, a signal wiring or the like is broadly designed, the open area ratio is reduced and thus the transmittance is reduced.

An object of the present invention is to provide a novel transparent type liquid crystal display having the high contrast and the transmittance that does not depend on the open area ratio.

SUMMARY OF THE INVENTION

A liquid crystal display of the present invention has to comprise at least a pair of first and second substrates and a liquid crystal layer interposed between the first and second substrates. A plurality of first light transmission portions are formed on the first substrate, and a plurality of second light transmission portions are formed on the second substrate. First second reflective components are disposed on the respective main surfaces of the first and second substrates in such a manner that an external light entering into the transparent type liquid crystal display through the plurality of first light transmission portions is reflected by the first and second reflective components and thereby passes through the liquid crystal layer a plurality of times and then the external light exits through the plurality of second light transmission portions.

BRIEF DESCRIPTIONS OF THE DRAWINGS

Preferred embodiments of the present inventor will now be described by way of example only, with reference to the accompanying drawings in which.

DETAILED DESCRIPTION OF THE PREFERRED EBODIMENTS OF THE INVENTION

Figure 1:
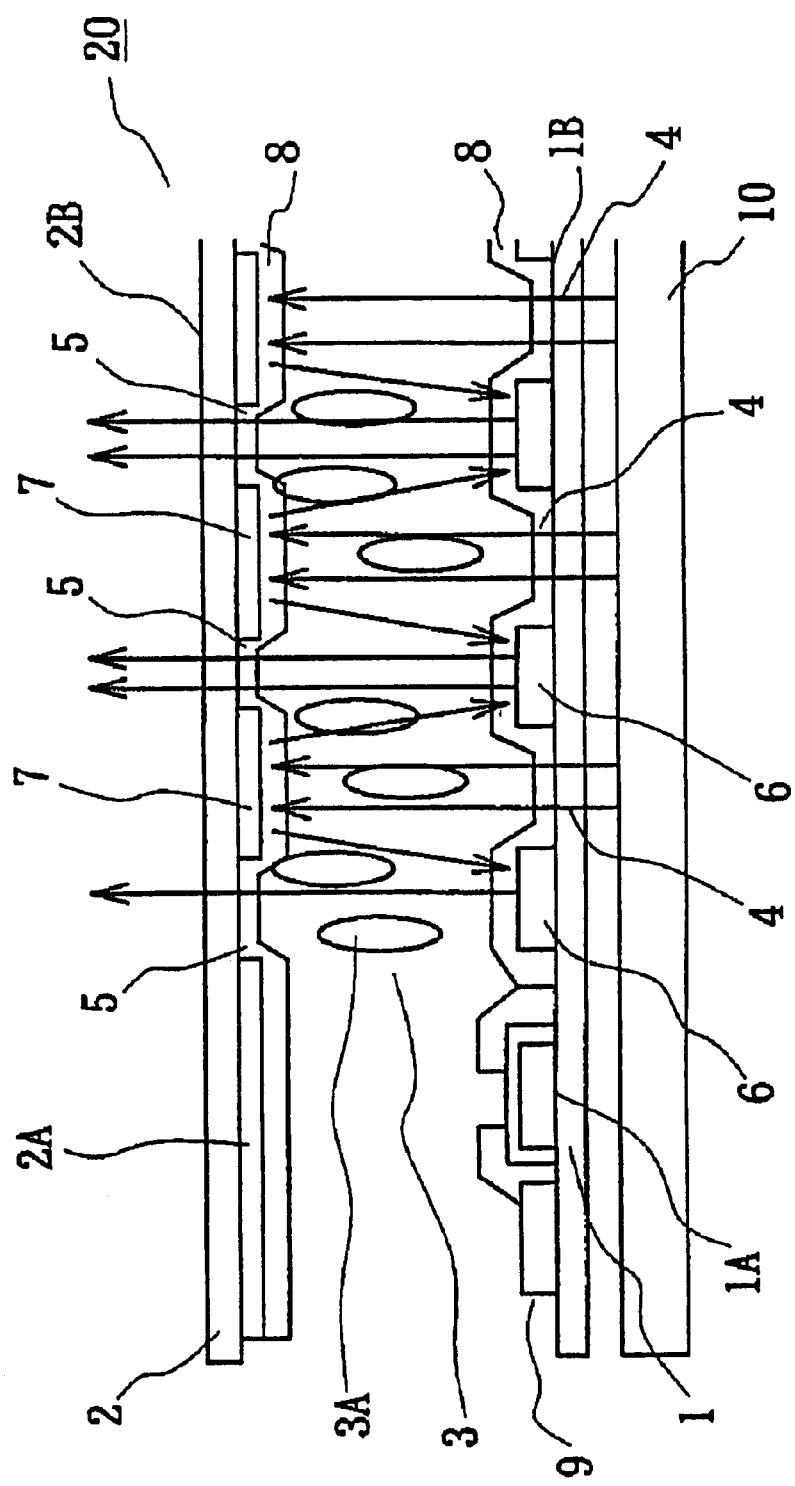
FIG. 1 is a schematic diagram of a transparent type liquid crystal display of the present invention.

FIG. 1 is a schematic diagram showing an example of the transparent type liquid crystal display of the present invention. FIG. 1 shows an absorption-mode liquid crystal display of a so-called GH mode in which the liquid crystal layer is doped with dichromatic dyes. In FIG. 1, the detail is omitted to simply describe the present invention.

A transparent type liquid crystal display 20 shown in FIG. 1 comprises a first substrate 1 and a second substrate 2. A liquid crystal layer 3 is interposed between the first and second substrates 1 and 2. The liquid crystal layer 3 is doped with dichromatic dyes 3A. A plurality of first light transmission portions 4 are formed on the first substrate 1. A plurality of second light transmission portions 5 are formed on the second substrate 2. TFT device 9 is formed on a main surface 1A of the first substrate 1 facing the second substrate 2 so that the liquid crystal layer 3 can be driven.

Similarly, first reflective components 6 composed of aluminum or the like are formed on the main surface 1A of the first substrate 1. On the other hand, second reflective components 7 composed of aluminum or the like are formed on a main surface 1B of the second substrate 2 facing the first substrate 1. A back light 10 is located at the back of the first substrate 1, as an external light for the transparent type liquid crystal display 20. Transparent conductive films 8 for applying an electric field to the liquid crystal layer 3 are formed on the respective main surfaces of the first and second substrates 1 and 2 in such a manner that they are in contact with the liquid crystal layer 3 and the first and second reflective components 6 and 7 are covered with them.

The second reflective components 7 are located opposite to the first light transmission portions 4. The first reflective components 6 are located opposite to the second light transmission portions 5. Although not shown in the drawing, the first and second reflective components 6 and 7 are inclined with respect to the first and second substrates 1 and 2, respectively in order to reflect the incident lights on these components 6 and 7 toward the second light transmission portions 5 and the first reflective components 6, respectively. A traveling direction of the light is indicated by arrows in the drawing.

In the transparent type liquid crystal display 20 shown in FIG. 1, the TFT device 9 is turned on and the electric field is applied to the liquid crystal layer 3 by the transparent conductive films 8. Thus, the dichromatic dyes 3A in the liquid crystal layer 3 are oriented in the direction perpendicular to the first and second substrates 1 and 2 so that they can transmit the external light.

Next, a principle of display of the transparent type liquid crystal display of the present invention will be described.

The light emitted from the back light 10 enters into the transparent type liquid crystal display 20 through the first light transmission portion 4, as the external light. The entering external light reaches the second reflective component 7. The external light is reflected by the second reflective component 7, whereby it reaches the first reflective component 6. Then, the external light is again reflected toward the second light transmission portion 5 by a gate electrode 6, so that it exits from the transparent type liquid crystal display 20. That is, in the transparent type liquid crystal display 20 shown in FIG. 1, the external light entering into the display passes through the liquid crystal layer 3 three times and then exits outward.

According to the transparent type liquid crystal display of the present invention, a high contrast can be obtained compared to the absorption-mode transparent type liquid crystal display of the prior art. This is caused by the following fact. The external light entering into the display is allowed to pass through the liquid crystal layer only once in the conventional transparent type liquid crystal display, whereas the external light is allowed to pass through the liquid crystal layer a plurality of times in the transparent type liquid crystal display of the present invention and thus a substantial optical length is increased.

Although the same effect can be obtained by thickening the liquid crystal layer, a response speed is reduced in this case. Therefore, the transparent type liquid crystal display of the present invention has a feature that the high contrast can be obtained with the response speed maintained.

Moreover, the transparent type liquid crystal display of the present invention actively reflects the external light entering into the display toward the light transmission portion by use of the reflective component. High transmittance which does not depend on an open area ratio can be therefore obtained, even if the open area ratio is low.

The present invention will be described in detail below in accordance with an embodiment of the invention.

In a transparent type liquid crystal display shown in FIG. 1, TFT device 9, a nonlinear active device is used so as to drive a liquid crystal layer 3 by an active matrix system. However, a method of driving liquid crystal in the transparent type liquid crystal display of the present invention is not limited in particular. Any one of a system using STN mode, a direct driving system, a beam address system, etc. can be employed. It should be noted that the active matrix system can obtain LCD having a high image quality, a high density and a large capacity.

Furthermore, the TFT device is used as the nonlinear active device, whereby an input terminal for a display signal can be separated from that for an address signal and thus LCD having the higher image quality can be obtained. First and second reflective components are not limited in particular, as far as they reflect an external light entering into the transparent type liquid crystal display a plurality of times and thereby allow the external light to pass through the liquid crystal layer a plurality of times. However, the first reflective component is preferably composed of a material such as aluminum, silver and dielectric multilayer having high reflectance and high resistance to corrosion from a liquid crystal material, dye or the like. The reflective component is composed of the same material as the material of a gate electrode constituting TFT device 9, e.g., aluminum, aluminum alloy, tungsten, molybdenum and polycrystalline silicon, whereby the reflective component can be manufactured at the same time when the gate electrode is manufactured, and thus a process of manufacturing the transparent type liquid crystal display can be facilitated. First and second reflective components 6 and 7 shown in FIG. 1 are inclined with respect to main surfaces 1A and 2A of first and second substrates 1 and 2, respectively. The first and second reflective components 6 and 7 are located so as to face second and first light transmission portions 5 and 4, respectively. However, the position of the second reflective component is not particularly limited when the external light entering through the first light transmission portion can be reflected and enter into the first reflective component by changing a degree of inclination with respect to the second substrate. Similarly, the position of the first reflective component is not particularly limited when the reflected light from the second reflective component can be again reflected and exit through the second light transmission portion by changing the degree of inclination with respect to the first substrate 1.

The first and second reflective components are located so as to face the second and first light transmission portions, respectively, whereby the external light can efficiently exit even after the external light is reflected a plurality of times in the transparent type liquid crystal display, and therefore the reduction in transmittance can be prevented. Furthermore, the degree of inclination of the reflective component can be simply set. As a result, the display can be easily designed and a degree of freedom of design is also improved.

Preferably, the first and second reflective components are constituted as described below in particular.

Figure 2:
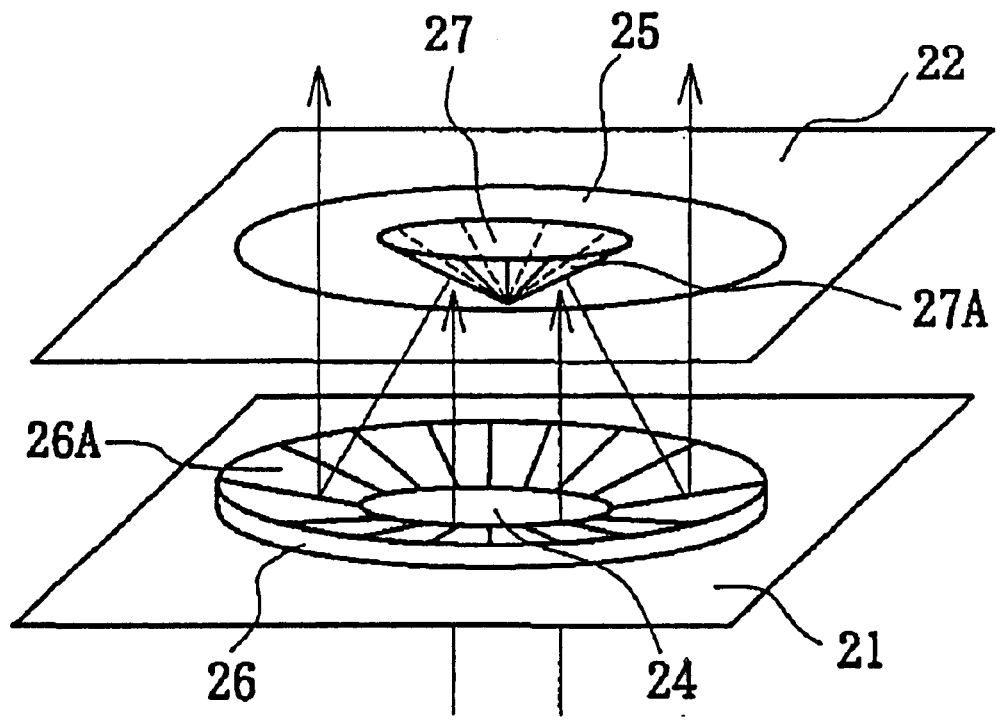
FIG. 2 is a perspective view of a preferred embodiment of a constitution of a reflective component in the transparent type liquid crystal display of the present invention.
Figure 3:
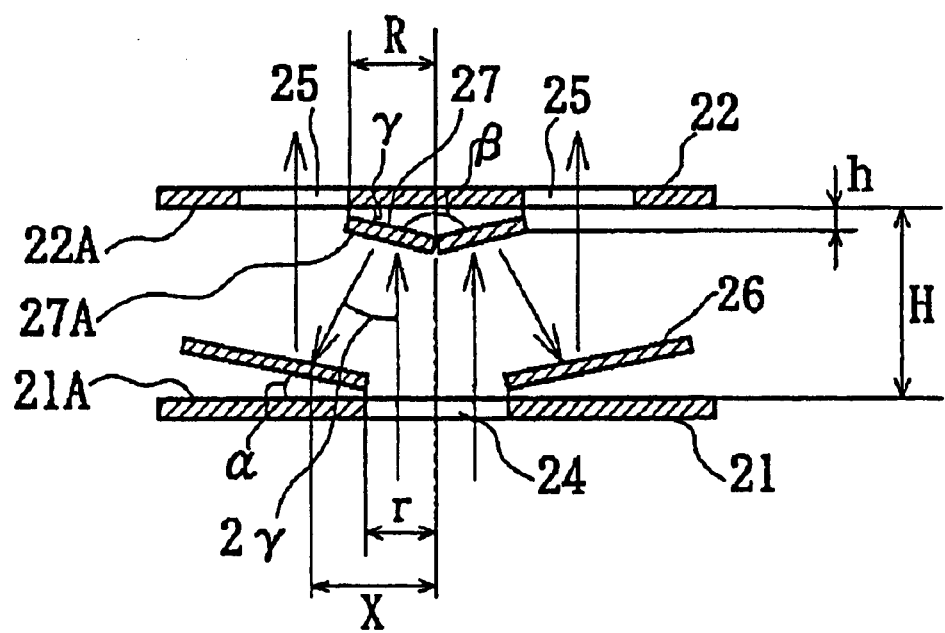
FIG. 3 is a cross sectional view of the constitution of the reflective component shown in FIG. 2.

FIG. 2 is a perspective view of a preferred embodiment of the constitution of the reflective component in the transparent type liquid crystal display of the present invention. FIG. 3 is a cross sectional view of the constitution of the reflective component shown in FIG. 2.

In the constitution of the reflective component shown in FIGS. 2 and 3, a circular first light transmission portion 24 and a doughnut-shaped second light transmission portion 25 are formed on first and second substrates 21 and 22 composed of a transparent material such as glass, respectively. A first reflective component 26 is formed on a main surface 21A of the first substrate 21 facing the second substrate 22 in such a manner that the first light transmission portion 24 is surrounded by the first reflective component 26. A second reflective component 27 is formed on a main surface 22A of the second substrate 22 facing the first substrate 21. The second reflective component 27 is surrounded by the second light transmission portion 25.

The first reflective component 26 is inwardly inclined about the first light transmission portion 24 so that it is concave. The second reflective component 27 is conical.

Although not shown in the drawing, ITO transparent conductive films for the liquid crystal layer are formed over the respective main surfaces of the first and second substrates 21 and 22. A traveling direction of the light is indicated by arrows in the drawing.

The external light enters into the display through the first light transmission portion 24 and reaches the conical second reflective component 27. The external light is reflected by a side surface 27A of the second reflective component and reaches the first reflective component 26. Then, the external light is again reflected by an upper surface 26A of the concave first reflective component 26 toward the second light transmission portion 25 and exits therethrough.

To prevent a loss of the entering external light, a diameter 2R of a bottom surface of the second reflective component 27 is equal to or larger than a diameter 2r of the first light transmission portion 24. The whole first light transmission portion 24 is covered with the whole second reflective component 27.

Preferably, an angle γ between the side surface 27A of the second reflective component 27 and the second substrate 22 is equal to an angle a of inclination. In other words, the side surface 27A of the second reflective component 27 is parallel to the upper surface 26A of the first reflective component 26. Thus, the external light vertically entering through the first light transmission portion 24 can vertically exit through the second light transmission portion 25.

The constitution of the reflective component shown in FIGS. 2 and 3 is employed, whereby the entering external light can be very efficiently reflected and the reflected light can very efficiently exit through the light transmission portion. The transparent type liquid crystal display having very high contrast and transmittance can be therefore obtained.

Next, a result of simulation of using the reflective component shown in FIGS. 2 and 3 is shown.

The angle between the side surface 27A of the second reflective component 27 and the second substrate 22 is assumed as γ, a height of the second reflective component 27 is assumed as h, and a distance between the first and second substrates 21 and 22 is assumed as H. In this case, the external light entering through the first light transmission portion 24 is reflected by the second reflective component 27. A distance X of horizontal movement along the first substrate 21 for the external light to be incident onto the first reflective component 26 is expressed as equation (1).

$$X=(H-h)\tan(2\gamma) \tag{1}$$

Table 1 shows the result of the following simulation and calculation. That is, a state of the external light, which is reflected by using the first and second reflective components 26 and 27 shown in FIGS. 2 and 3, is simulated in accordance with the equation (1). Then, the distance X of movement is calculated.

In Table 1, the calculation is performed under the assumption that the distance H between the first and second substrates 21 and 22 is fixed to 5 μm. The calculation is performed under the assumption that a distance r from the center of the first light transmission portion 24 to the end of the first reflective component 26 is equal to a radius R of the bottom surface of the second reflective component 27.

In Table 1, a horizontal axis represents the distance r, i.e., the radius R, and a vertical axis represents the height h of the second reflective component 27. A relationship between the radius R and the height h is expressed as equation (2).

$$\tan \gamma = h/R(=r) \tag{2}$$

Therefore, the horizontal axis of Table 1 substantially represents the angle γ between the side surface 27A of the second reflective component 27 and the second substrate 22.

TABLE 1

| | | | | | | R (=r), μm | | | | | | | |
|---|---|---|---|---|---|---|---|---|---|---|---|---|---|
| X | | 2 | 2.5 | 3 | 3.5 | 4 | 4.5 | 5 | 6 | 7 | 8 | 9 | 10 |
| h, μm | 0.2 | 0.97 | 0.77 | 0.64 | 0.55 | 0.48 | 0.43 | 0.38 | 0.32 | 0.27 | 0.24 | 0.21 | 0.19 |
| | 0.4 | 1.92 | 1.51 | 1.25 | 1.07 | 0.93 | 0.82 | 0.74 | 0.62 | 0.53 | 0.46 | 0.41 | 0.37 |
| | 0.6 | *2.90 | 2.24 | 1.83 | 1.55 | 1.35 | 1.19 | 1.07 | 0.89 | 0.76 | 0.66 | 0.59 | 0.53 |
| | 0.8 | *4.00 | *2.99 | 2.41 | 2.03 | 1.75 | 1.54 | 1.38 | 1.14 | 0.97 | 0.85 | 0.75 | 0.68 |
| | 1 | *5.33 | *3.81 | *3.00 | 2.49 | 2.13 | 1.87 | 1.67 | 1.37 | 1.17 | 1.02 | 0.90 | 0.81 |
| | 1.2 | *7.13 | *4.74 | *3.62 | 2.95 | 2.51 | 2.18 | 1.94 | 1.58 | 1.34 | 1.17 | 1.03 | 0.93 |
| | 1.4 | *9.88 | *5.87 | *4.30 | 3.43 | 2.87 | 2.48 | 2.19 | 1.78 | 1.50 | 1.30 | 1.15 | 1.03 |
| | 1.6 | *15.11 | *7.37 | *5.07 | *3.93 | 3.24 | 2.77 | 2.42 | 1.95 | 1.64 | 1.42 | 1.25 | 1.12 |
| | 1.8 | *30.32 | *9.57 | *6.00 | *4.48 | 3.61 | 3.05 | 2.65 | 2.11 | 1.76 | 1.52 | 1.33 | 1.19 |
| | 2 | | *13.33 | *7.20 | *5.09 | *4.00 | 3.32 | 2.86 | 2.25 | 1.87 | 1.60 | 1.40 | 1.25 |
| | 2.2 | | *21.84 | *8.88 | *5.82 | *4.42 | 3.60 | 3.06 | 2.37 | 1.95 | 1.67 | 1.46 | 1.29 |
| | 2.4 | | *63.67 | *11.56 | *6.73 | *4.88 | 3.88 | 3.24 | 2.48 | 2.02 | 1.71 | 1.49 | 1.32 |
| | 2.6 | | | *16.71 | *7.96 | *5.40 | 4.16 | 3.42 | 2.56 | 2.07 | 1.74 | 1.51 | 1.34 |
| | 2.8 | | | *31.86 | *9.78 | *6.04 | 4.47 | 3.59 | 2.63 | 2.10 | 1.75 | 1.52 | 1.34 |
| | 3 | | | | *12.92 | *6.86 | *4.80 | 3.75 | 2.67 | 2.10 | 1.75 | 1.50 | 1.32 |
| | 3.2 | | | | *20.06 | *8.00 | *5.18 | 3.90 | 2.68 | 2.08 | 1.71 | 1.47 | 1.28 |
| | 3.4 | | | | *55.19 | *9.80 | *5.63 | 4.05 | 2.67 | 2.03 | 1.66 | 1.41 | 1.23 |
| | 3.6 | | | | | *13.26 | *6.22 | 4.19 | 2.63 | 1.96 | 1.58 | 1.33 | 1.16 |
| | 3.8 | | | | | *23.38 | *7.06 | 4.32 | 2.54 | 1.85 | 1.47 | 1.23 | 1.07 |
| | 4 | | | | | | *8.47 | 4.44 | 2.40 | 1.70 | 1.33 | 1.11 | 0.95 |
| | 4.2 | | | | | | *11.59 | 4.57 | 2.20 | 1.50 | 1.16 | 0.95 | 0.82 |
| | 4.4 | | | | | | *26.70 | 4.68 | 1.90 | 1.25 | 0.95 | 0.77 | 0.65 |
| | 4.6 | | | | | | | 4.79 | 1.49 | 0.93 | 0.69 | 0.55 | 0.47 |
| | 4.8 | | | | | | | 4.90 | 0.89 | 0.52 | 0.38 | 0.30 | 0.25 |
| | 5 | | | | | | | | | | | | |

In order that the external light reflected by the second reflective component 27 is incident onto the first reflective component 26, it is again reflected by the first reflective component 26 and it exits through the second light transmission portion 25, the following expression (3) must be satisfied.

In the equation (3), X is the distance of movement and r is the distance from the center of the first light transmission portion 24 to the end of the first reflective component 26. In other words, r is equal to the radius R of the bottom surface of the second reflective component.

$$X > R(=r) \tag{3}$$

In Table 1, only those portions with (*) satisfying the expression (3) is therefore effective ranges that are practically available.

No portion with (*) does not exist when R (=r) is 5 μm or more. In this simulation, the calculation is performed under the assumption that the distance H between the first and second substrates 21 and 22 is set to 5 μm, as described above. Therefore, the result shown in Table 1 shows that the distance r from the center of the first light transmission portion 24 to the end of the first reflective component 26, i.e., the radius R of the bottom surface of the second reflective component must be smaller than the distance H.

To take orientation of the liquid crystal or the like into account, preferably, the height h of the second reflective component 27 is equal to or less than 40% of the distance H between the first and second substrates 21 and 22 in order that the external light entering through the first light transmission portion 24 exits through the second light transmission portion 25, as described above. Accordingly, a shaded portion is the most desirable range in Table 1.

In FIGS. 2 and 3, the first reflective component is concave and the second reflective component is conical. However, the first reflective component can be conical and the second reflective component can be concave. In this case, the desirable range of a conical vertex angle and the desirable range of the angle with respect to the main surface of the substrate are the same as the above-described range.

In FIGS. 1 to 3, preferably, a back surface 1B of the first substrate 1 or the like has a specular effect for reflecting at least a part of the external light. This permits the multiple reflection of the external light between a back light 10 and the first substrate 1. Efficiency in using the external light can be therefore improved even if an occupation ratio of the first light transmission portion 4 to the first substrate 1, i.e., an open area ratio is low.

Specifically, a transparent substrate such as glass is optically polished or the same material as the material of the first reflective component or the like is disposed on the back surface of the first substrate, whereby the specular effect can be given to the back surface of the first substrate.

The transparent type liquid crystal display shown in FIG. 1 has an absorption mode, a so-called GH mode in which the liquid crystal layer is doped with dichromatic dyes. However, the transparent type liquid crystal display of the present invention is not limited to this absorption mode. Instead of doping the liquid crystal layer with the dichromatic dyes, a color filter can be disposed on the main surface 1A or back surface 1B of the first substrate 1, the main surface 2A or back surface 2B of the second substrate 2, or the like. In this case, an object of the present invention can be also fully achieved.

Moreover, the transparent type liquid crystal display of the present invention can further improve the transmittance because it does not use a sheet polarizer.

Furthermore, the external light passes through the liquid crystal layer in the display three times after all in the transparent type liquid crystal display shown in FIG. 1 and the constitution of the reflective component shown in FIGS. 2 and 3. However, the number of times is not limited, as far as the number of times the light passes through the liquid crystal is the plural number.

Moreover, the constitution of the transparent type liquid crystal display of the present invention can be used for a reflective type liquid crystal display. However, only the natural light can be used in the reflective type liquid crystal display. Consequently, an absolute amount of the transmitted light is lacking and thus the effect of the present invention cannot be fully achieved.

For the transparent type liquid crystal display, the back surface of the first substrate is made reflective for the external light as described above or the intensity of the back light itself is increased, whereby the absolute amount of the transmitted light can be controlled.

Accordingly, the constitution of the present invention can be suitably used in the transparent type liquid crystal display.

According to the present invention, the high-contrast transparent type liquid crystal display can be obtained without reducing a response speed. Moreover, the external light is actively reflected by using the reflective component so that it exits through the light transmission portion. Thus, the transmittance is not reduced even if the open area ratio is low. The degree of freedom of design can be therefore improved. For example, TFT can be increased in size, or a gate, a signal wiring or the like can be broadly designed.

While the invention has been particularly shown and described with respect to preferred embodiments thereof, it will be understood by those skilled in the art that the foregoing and other changes in form and details may be made therein without departing form the spirit and scope of the invention.

Having thus described our invention, what we claim as new, and desire to secure by Letters Patent is:

1. A transparent type liquid crystal display comprising:
   at least a pair of first and second substrates;
   a liquid crystal layer interposed between said first and second substrates;
   a plurality of first light transmission portions formed on said first substrate;
   a plurality of second light transmission portions formed on said second substrate; and
   first reflective components and second reflective components disposed on the respective main surfaces of said first and second substrates,
   wherein an external light entering through said plurality of first light transmission portions passes through said liquid crystal layer and then exits through said plurality of second light transmission portions, and
   wherein said external light entering into said transparent type liquid crystal display through said plurality of first light transmission portions is reflected by said first and second reflective components and thereby passes through said liquid crystal layer a plurality of times and then said external light exits through said plurality of second light transmission portions.

2. The transparent type liquid crystal display according to claim 1, wherein the other side of the main surface of said first substrate has a specular effect for reflecting at least a part of said external light.

3. The transparent type liquid crystal display according to claim 2, wherein said liquid crystal layer is doped with dichromatic dyes.

4. The transparent type liquid crystal display according to claim 2, wherein a color filter is disposed on at least one of said first and second substrates.

5. The transparent type liquid crystal display according to claim 1 wherein a nonlinear active device is located on the main surface of said first substrate facing said second substrate so that said liquid crystal layer is driven by said nonlinear active device.

6. The transparent type liquid crystal display according to claim 5, wherein said nonlinear active device is TFT device.

7. The transparent type liquid crystal display according to claim 6, wherein at least either said first or second reflective component is composed of the same material as the material of a gate electrode constituting said TFT device.

8. The transparent type liquid crystal display according to claim 1, wherein said second reflective components are inclined with respect to the main surface of said second substrate and positioned so as to face said first light transmission portions in such a manner that said external light entering into said transparent type liquid crystal display through said first light transmission portions is reflected by said second reflective components and enters into said first reflective components.

9. The transparent type liquid crystal display according to claim 8, wherein said second reflective component is conical.

10. The transparent type liquid crystal display according to claim 9, wherein said conical second reflective component is surrounded by said second light transmission portion.

11. The transparent type liquid crystal display according to claim 9, wherein said first light transmission portion is surrounded by said first reflective component, and said first reflective component is inclined so that it is inwardly concave.

12. The transparent type liquid crystal display according to claim 11, wherein a side surface of said conical second reflective component is parallel to an upper surface of said concave first reflective component.

13. The transparent type liquid crystal display according to claim 9, wherein a height of said conical second reflective component is less than a distance between said first and second substrates.

14. The transparent type liquid crystal display according to claim 8, wherein said first reflective component is conical.

15. The transparent type liquid crystal display according to claim 14, wherein said conical first reflective component is surrounded by said first light transmission portion.

16. The transparent type liquid crystal display according to claim 14, wherein said second light transmission portion is surrounded by said second reflective component, and said second reflective component is inclined so that it is inwardly concave.

17. The transparent type liquid crystal display according to claim 16, wherein the side surface of said conical first reflective component is parallel to the upper surface of said concave second reflective component.

18. The transparent type liquid crystal display according to claim 14, wherein the height of said conical first reflective component is less than the distance between said first and second substrates.

19. The transparent type liquid crystal display according to claim 1, wherein said first reflective components are inclined with respect to said first substrate and positioned so as to face said second light transmission portions in such a manner that said external light reflected by said second reflective components is again reflected by said first reflective components and exits through said second light transmission portions.

20. The transparent type liquid crystal display according to claim 19, wherein said second reflective component is conical.

21. The transparent type liquid crystal display according to claim 20, wherein said conical second reflective component is surrounded by said second light transmission portion.

22. The transparent type liquid crystal display according to claim 20, wherein said first light transmission portion is surrounded by said first reflective component, and said first reflective component is inclined so that it is inwardly concave.

23. The transparent type liquid crystal display according to claim 22, wherein a side surface of said conical second reflective component is parallel to an upper surface of said concave first reflective component.

24. The transparent type liquid crystal display according to claim 20, wherein a height of said conical second reflective component is less than a distance between said first and second substrates.

25. The transparent type liquid crystal display according to claim 19, wherein said first reflective component is conical.

26. The transparent type liquid crystal display according to claim 25, wherein said conical first reflective component is surrounded by said first light transmission portion.

27. The transparent type liquid crystal display according to claim 25, wherein said second light transmission portion is surrounded by said second reflective component, and said second reflective component is inclined so that it is inwardly concave.

28. The transparent type liquid crystal display according to claim 27, wherein the side surface of said conical first reflective component is parallel to the upper surface of said concave second reflective component.

29. The transparent type liquid crystal display according to claim 25, wherein the height of said conical first reflective component is less than the distance between said first and second substrates.

* * * * *